Aug. 21, 1923.
W. C. RODABUSH ET AL
1,465,785
FUEL PREHEATER FOR INTERNAL COMBUSTION ENGINES
Filed March 3, 1920      2 Sheets-Sheet 1
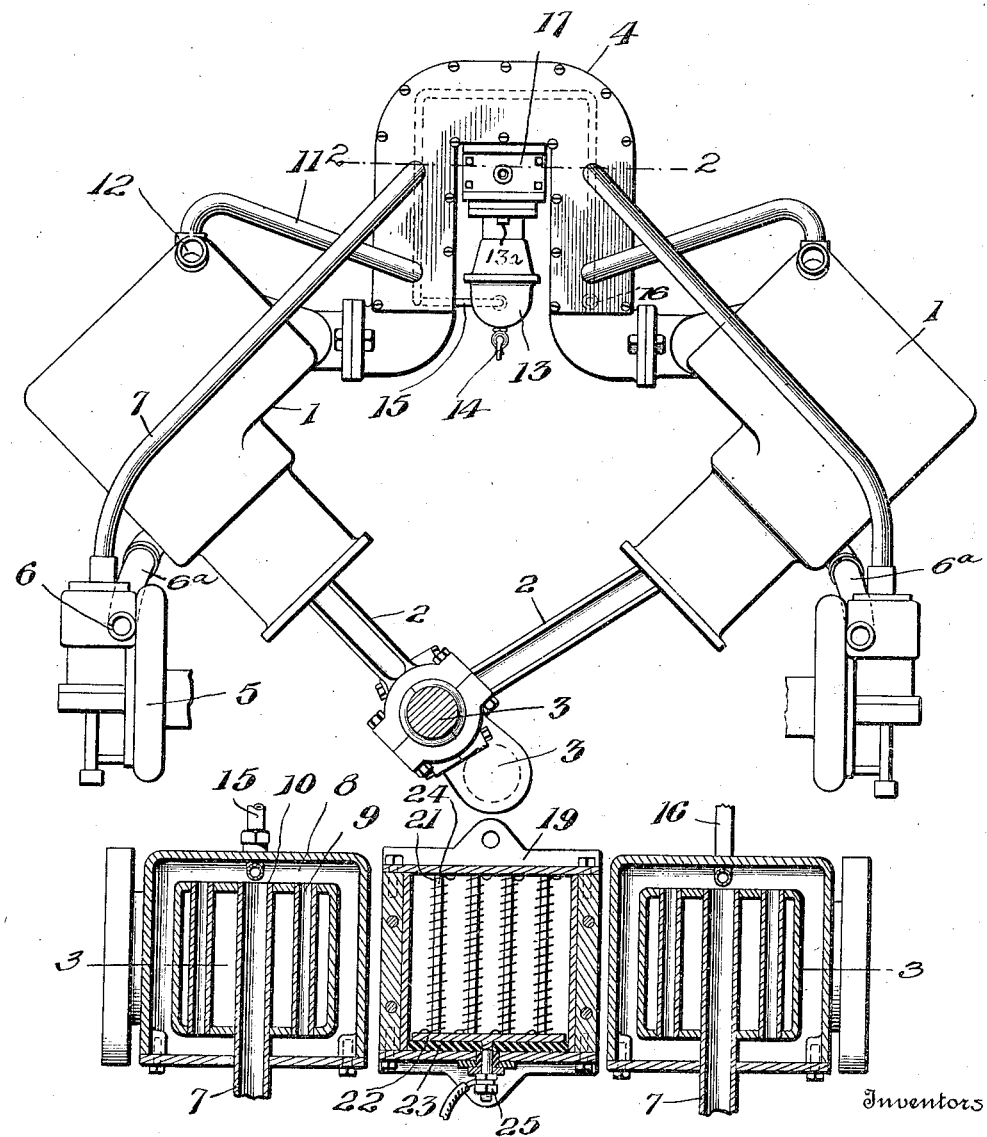

Aug. 21, 1923.  
W. C. RODABUSH ET AL  
1,465,785  
FUEL PREHEATER FOR INTERNAL COMBUSTION ENGINES  
Filed March 3, 1920  2 Sheets-Sheet 2
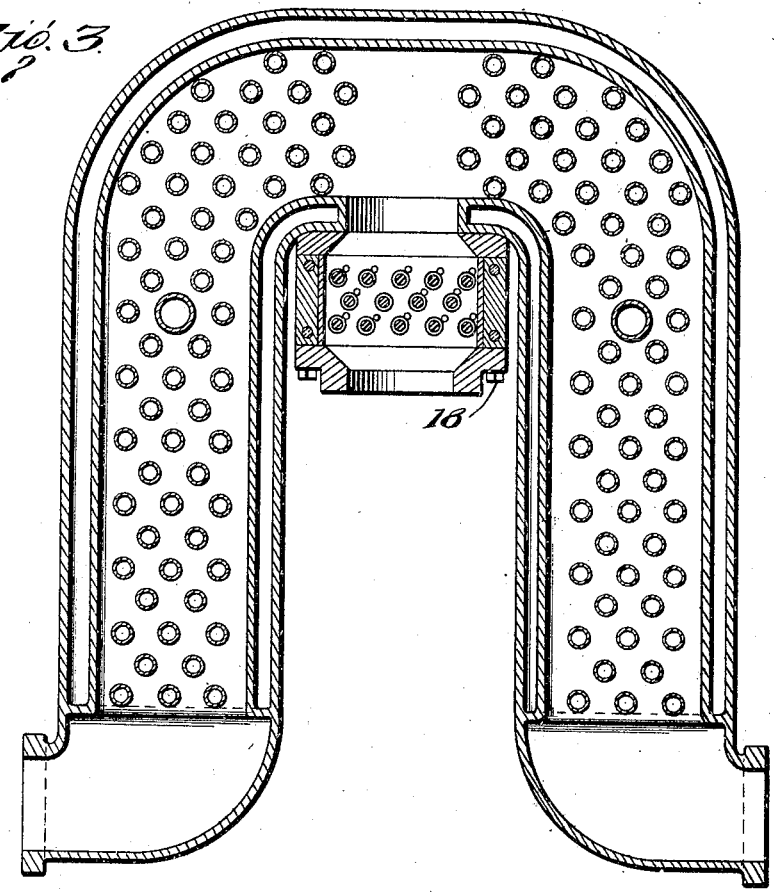
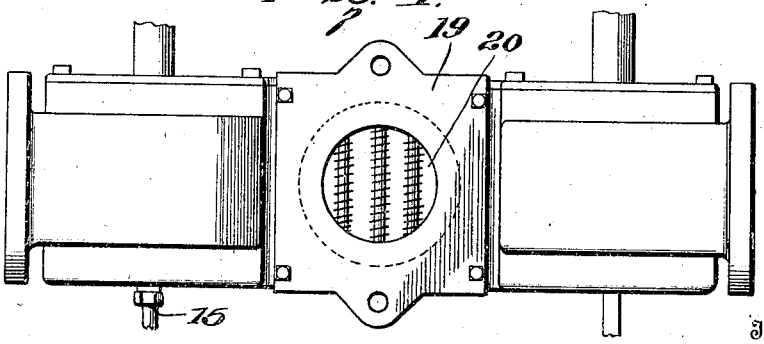
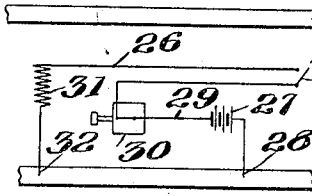
Inventors  
W. C. Rodabush,  
F. Schlueter  
By A. M. Houghton  
Their Attorney
Witness Patented Aug. 21, 1923.

1,465,785

UNITED STATES PATENT OFFICE.

WALTER C. RODABUSH, OF HARRISBURG, PENNSYLVANIA, AND FRED SCHLUETER, OF NEW YORK, N. Y.

FUEL PREHEATER FOR INTERNAL-COMBUSTION ENGINES.

Application filed March 3, 1920. Serial No. 362,941.

*To all whom it may concern:*

Be it known that we, WALTER C. RODA-BUSH and FRED SCHLUETER, citizens of the United States, WALTER C. RODABUSH being a resident of Harrisburg, in the county of Dauphin and State of Pennsylvania, and FRED SCHLUETER being a resident of New York, in the county of New York and State of New York, have invented certain new and useful Improvements in Fuel Preheaters for Internal-Combustion Engines, of which the following is a specification.

This invention relates to fuel preheaters for internal combustion engines; and it comprises an intake manifold provided with a plurality of water tubes in communication with the radiator, means located between the carbureter and the inlet of the manifold for heating carbureted fuel, and means in the manifold adapted to receive heat from the water tubes thereof and in communication with the source of fuel supply and the inlet of the carbureter for preheating the liquid fuel; all as more fully hereinafter set forth and as claimed.

It is a desideratum in the art to which this invention relates to provide means for preheating the liquid fuel, heating the carbureted mixture and to temporarily heat the carbureted mixture as it leaves the carbureter. Many attempts have been made to provide heating devices for accomplishing these purposes, but these devices have been expensive in construction and complicated in operation, and have usually consisted of a number of parts, all of which must be carefully assembled and adjusted.

One of the objects of the present invention is to provide a simple and inexpensive and unitary fuel preheating device, not only for the carbureted mixture, but also for the liquid fuel delivered to the carbureter.

In the accompanying drawings, we have shown one form of a specific embodiment of our invention. In the drawings, Figure 1 is a front elevation showing, more or less diagrammatically, the manifold heater and water circulation. Figure 2 is a horizontal section taken along the line 2—2 of Figure 1. Figure 3 is a vertical section along line 3—3 of Figure 2. Figure 4 is a top plan view, partly in section, of the manifold, showing the electric heater; and Figure 5 is a diagram of the electric circuit, including the electric heater.

In the drawings we have illustrated a twin cylinder engine with the inverted U manifold; such an engine as is used in the Cadillac automobile. The twin cylinders are indicated by the reference numeral 1, the piston rods by 2, the cranks by 3, and the manifold as a whole by reference numeral 4.

Usually in this type of engine, the circulation of water through the radiator and water jackets is maintained by two centrifugal pumps, diagrammatically shown at 5, located at the front end of the engine. The hottest water, which surrounds the combustion chambers in the head, is delivered to the radiator and the coolest water is taken from the radiator by the pump and delivered to the jacket. As is well known, the pumps of this type are provided with balanced valves and thermostatic control members, so that when the engine is cold, the valves are closed, and the supply from the radiator is cut off. The water is then circulated only through the water jackets of the cylinder heads. Our invention permits us to take advantage of this usual thermostatic control of the water circulation.

From the radiator, not shown, the water is delivered to the thermostatically controlled pump 5 at 6 and from there, through the pipe or tube 6ª, is delivered to the lower part of the cylinder jacket. From the cylinder jacket, the water is delivered through pipe 11 to the manifold. The water from the manifold is delivered by pipe 7 back to the pump, and is taken from the rear end of the manifold as shown by the extension 10 on the pipe 7. The water goes back to the radiator from the top of the jacket through pipe 12. The manifold is jacketed as at 8 and is further provided with a plurality of transverse water tubes 9 over and between which the carbureted mixture flows, as will be more fully hereinafter explained. Water from the radiator is delivered by the pump 5 through line 6ª and is removed from the manifold by the pipe 7 leading to the pump. The water is conducted to the radiator through the pipe 12 which is at the uppermost portion of the jacket of the cylinder block.

The carbureter 13 is located adjacent the upper part of the manifold, bolts 13ª being provided for securing the carbureter in position. It is provided with the usual drain 14 and the gasoline tube 15. This tube is located in the manifold adjacent the water heated tubes therein and is therefore heated by the water delivered to the manifold, as explained. From the manifold, the tube indicated as 16 leads to the gasoline tank or other source of fluid fuel.

Between the carbureter 13 and the manifold 4 is located the temporary carbureted mixture-electric heating device 17. This may be attached to the manifold by means of bolts 18 extending through the frame 19 or may be cast integral or soldered or otherwise secured in position. This electric heater comprises the frame 19, having the hole 20 therein to fit over the carbureter, and contains a number of staggered supporting porcelain posts 21, carried by the bus-bar 22 and suitably insulated, as at 23, from the frame. Resistant wire 24 is coiled around and supported by the posts 21. The bus-bar is provided with a terminal 25 and insulated wire 26 leading therefrom to the electric circuit. It is to be understood that this electric heater is grounded at the manifold.

In Figure 5, we have shown, diagrammatically, the electric lighting and starting circuit in which our electric heater is included. The battery is diagrammatically indicated at 27, grounded to the frame at 28 and having the lead 29 to the self-starter 30. The electric heating device diagrammatically shown at 31 is grounded as at 32 and has the lead 26 leading to a switch 33 shown in open position. When the switch 33 is closed, the resistance 31 is energized. In operation this switch may be closed, particularly in cold weather, just before or simultaneously with the starting of the engine, so that the mixture flowing from the carbureter through 34 will pass the resistant wires and become heated upon entering the intake manifold. As stated, the electric heater is arranged between the carbureter and the manifold.

The operation of the apparatus is obvious from the foregoing. By the construction described, we are enabled to take advantage of the thermostatic control of the water circulating system explained. The thermostatic pumps operate to circulate the water only through the water jackets of the cylinder head and the water tubes of the manifold when the engine is cold. When the engine is warmer, the thermostatic pump allows the water to go to the radiator. The plurality of water tubes provide large heating surfaces, not only for the carbureted mixture, but for the liquid fuel being delivered to the carbureter; and when, by means of the thermostatically controlled pumps, the small amount of water is circulated merely through the pumps, the tubes of the manifold and the engine jackets, the fluid fuel and the carbureted mixture are quickly heated. Through the construction described, we are enabled to save a large percentage of the fuel which would otherwise be needed in starting and in running the engine in cold weather.

What we claim is:—

1. A manifold for an internal combustion engine having an inlet for the combustible mixture and an outlet for delivering the mixture to the engine cylinder, a carbureter in communication with the inlet of the manifold, means interiorly of the manifold for heating the mixture from the carbureter, a feed pipe for fluid fuel leading to the carbureter from a source of supply through the said heated manifold, whereby the fluid fuel is heated prior to its delivery to the carbureter by means of the heating means in the manifold and whereby the carbureted mixture delivered to the manifold is heated therein by the same means which heats the fluid fuel delivered to the carbureter.

2. A manifold for an internal combustion engine having an inlet for the combustion mixture and an outlet for delivering the mixture to the engine cylinder, a carbureter in communication with the inlet of the manifold, an electric heater interposed between the carbureter and the inlet of the manifold, and a plurality of horizontal transverse staggered water heated tubes in the manifold in the path of travel of the combustible mixture.

3. A manifold for an internal combustion engine comprising means for delivering the combustible mixture to the engine cylinder, an electric heater interposed between the carbureter and the inlet of the manifold, a water jacket surrounding the manifold and a plurality of transverse tubes connected to the water jacket and extending through the manifold and adapted to cause a zigzag passage of the combustible mixture through the manifold.

4. A manifold for an internal combustion engine having an inlet and an outlet for the combustible mixture, a carbureter, an electric heater interposed between the carbureter and the manifold, a water jacket surrounding the manifold, and a plurality of transverse staggered water passages connected to the jacket and extending through the manifold and adapted to cause a zig-zag passage of the mixture through the manifold.

In testimony whereof, we affix our signatures hereto.

February 26th, 1920.

WALTER C. RODABUSH.

February 28, 1920.

FRED SCHLUETER.